(12) United States Patent
Yeh

(10) Patent No.: US 7,839,629 B2
(45) Date of Patent: Nov. 23, 2010

(54) FIXTURE FOR A DISK DRIVE

(75) Inventor: Chien-Wen Yeh, Taipei (TW)

(73) Assignees: Silitek Electronic (Guangzhou) Co., Ltd., Guangzhou (CN); Lite-On Technology Corporation, Taipei (TW)

( * ) Notice: Subject to any disclaimer, the term of this patent is extended or adjusted under 35 U.S.C. 154(b) by 34 days.

(21) Appl. No.: 12/078,353

(22) Filed: Mar. 31, 2008

(65) Prior Publication Data

US 2009/0195975 A1    Aug. 6, 2009

(30) Foreign Application Priority Data

Feb. 1, 2008    (CN) .......................... 2008 1 0026262

(51) Int. Cl.
*G06F 1/16* (2006.01)
*A47B 81/00* (2006.01)
*A47F 7/00* (2006.01)

(52) U.S. Cl. ............................ 361/679.37; 361/679.33; 312/223.2; 211/26

(58) Field of Classification Search .......... 361/724–727, 361/679.01–679.45, 679.55–679.59; 312/223.1, 312/223.2; 211/26
See application file for complete search history.

(56) References Cited

U.S. PATENT DOCUMENTS

| 6,452,792 | B1 * | 9/2002 | Chen ....................... 361/679.35 |
| 6,469,890 | B1 * | 10/2002 | Gan ....................... 361/679.35 |
| 6,944,013 | B2 * | 9/2005 | Yang ....................... 361/679.33 |
| 7,355,846 | B1 * | 4/2008 | Chen et al. ............. 361/679.33 |

* cited by examiner

*Primary Examiner*—Jayprakash N Gandhi
*Assistant Examiner*—Nidhi Desai
(74) *Attorney, Agent, or Firm*—Rosenberg, Klein & Lee

(57) ABSTRACT

A fixture for fixing a disk drive inside a computer case is disclosed. The fixture includes a body, wherein at least a screw eye is set on the body to fix the body on the disk drive; at least a positioning brace and at least an elastic buckle extending from said body in a direction away from the disk drive to fix the body inside the computer case.

10 Claims, 6 Drawing Sheets

FIXTURE FOR A DISK DRIVE

BACKGROUND OF THE INVENTION

1. Field of the Invention

The present invention relates to a fixture of a disk drive, and more particular to a modular structure fixed inside a computer case without any screw.

2. Description of Related Art

Hardware of a computer generally includes: a main board, interface cards, hard drives, a CD-ROM, etc. All these modules are integrated in a computer case. Because the floppy disk drive, the hard drive, and the CD-ROM can be selectively configured, the housings of the floppy disk drive, the hard drive, and the CD-ROM are usually configured inside the computer case firstly for easy assembly and subsequent expansion, and the floppy disk drive, the hard drive, and the CD-ROM can be assembled or disassembled or expanded via the housings.

Presently, a conventional disk drive fixing method includes: fixing a housing inside a computer case via screws; then setting a disk drive onto the housing, wherein the disk drive is fixed onto the housing by the screws, so that the disk drive is fixed inside the computer case. However, the fixing method has some disadvantages, for example, a screwdriver must be used when assembling or disassembling the disk drive. Thus, the procedure is complex and taxing, it is hard to increase the production efficiency.

Based on the aforementioned matter, some disk drive fixing methods which are easy for assembly or disassembly are proposed. One of the methods includes: setting two sliding bars on a disk drive housing (a position inside a computer case to be set with a disk drive); and respectively setting two sliding rails on two sides of the disk drive; sliding the disk drive onto the disk drive housing. However, when assembling the disk drive, also, a screwdriver must be used to tighten the screws to fix the sliding bars on the computer case, so the procedure is complex and time consuming. Thus, it is necessary to provide a low-cost and timesaving fixing method for disk drives.

Consequently, because of the technical defects of described above, the applicant keeps on carving unflaggingly through wholehearted experience and research to develop the present invention, which can effectively improve the defects described above.

SUMMARY OF THE INVENTION

The object of the present invention is to provide a disk drive fixture which can save assembly time.

For achieving the object described above, the present invention provides a fixture. The fixture includes a body, at least a screw eye which is set on the body to fix the body on the disk drive; at least a positioning brace and at least an elastic buckle extending from the body away from the disk drive to fix the body inside the computer case.

Preferably, the material of the body is plastic or metal.

Selectively, the body has four corners, and the screw eyes are respectively defined on the four corners.

Preferably, the body includes a first surface and a second surface opposite to the first surface, and the first surface is combined with the computer case, and the second surface is combined with the disk drive.

Preferably, the positioning brace is an L-shaped bent piece.

Preferably, the positioning brace includes a first bent piece, a second bent piece, and a guiding rib, wherein the first bent piece extends from the body for a length, then is bent to form the second bent piece, the guiding rib is formed on the second bent piece and perpendicular to the first bent piece and the second bent piece respectively, and the guiding rib is set on a same side with the first bent piece.

Preferably, the elastic buckle is an elastic hook, and the elastic hook includes an elastic arm and a hook set on the end of the elastic arm, wherein the elastic arm extends along a direction parallel with the surfaces of the body, and the hook extends along a direction perpendicular to the surfaces of the body.

Preferably, the hook has an arc-shaped side wall.

Cooperating with the fixture, the computer case includes a side wall, and the side wall defines at least a positioning hole and at least a hook hole therein, wherein the positioning brace extends into the positioning hole, and the elastic buckle extends into the hook hole.

Preferably, a guiding slot is set in the positioning hole. In an assembling state, the guiding rib is blocked in the guiding slot to tightly fix the fixture in the computer case.

The positioning brace and the elastic buckle of the fixture are designed as aforementioned so that the process that the disk drive is assembled inside the computer case is very simply and timesaving.

DETAILED DESCRIPTION OF THE PREFERRED EMBODIMENTS

Figure 1:
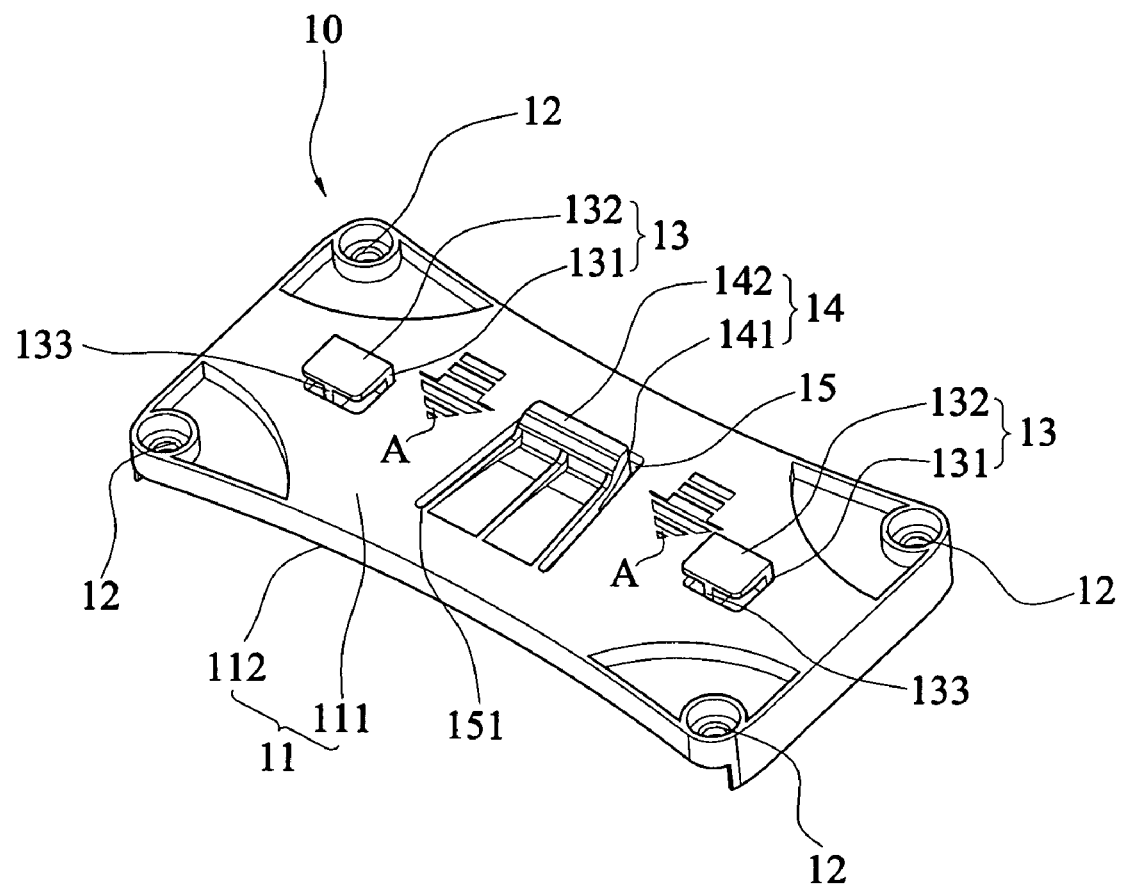
FIG. 1 is a perspective schematic view showing a fixture of a preferred embodiment according to the present invention.

Please refer to FIG. 1, a fixture 10 which fixes a disk drive inside a computer case is provided. The fixture 10 includes a body 11, and a plurality of screw eyes 12 are set on the body 11. In the present embodiment, there are four screw eyes 12 which are respectively distributed on the four corners of the body 11. The fixture 10 may be fixed on the disk drive by screws engaging with the screw eyes 12.

The body 11 further includes a first surface 111 and a second surface 112 opposite to the first surface 111. A plurality of positioning braces 13 and an elastic buckle 14 extend from the first surface 111. There are two positioning braces 13, and the elastic buckle 14 is located between the two positioning braces 13. The second surface 112 is used to be fixedly combined with the disk drive, and the first surface 111 is used to be combined with the computer case.

The positioning brace 13 is an L-shaped bent piece, which is in-molded with the body 11 and includes a first bent piece 131 and a second bent piece 132. The first bent piece 131 is perpendicular to the second bent piece 132. The first bent piece 131 extends perpendicularly for a length from the first surface 111, and then is bent to form the second bent piece 132. The second bent piece 132 is parallel with the first surface 111 and is bent towards the direction of the arrowhead A as shown in the FIG. 1. Preferably, the positioning brace 13 includes a guiding rib 133 which is formed on a surface of the second bent piece 132, and the surface is adjacent to and parallel with the first surface 111 of the body 11. The guiding rib 133 is perpendicular to the first bent piece 131 and the second bent piece 132 respectively. The guiding rib 133 and the first bent piece 131 are set on a same side.

The elastic buckle 14 is set in a hollow-out portion 15 defined on the first surface 111 of the body 11, and the hollow-out portion 15 includes an inside wall 151. Preferably, the elastic buckle 14 is an elastic hook, which includes an elastic arm 141 and a hook 142. The elastic arm 141 extends from the inside wall 151 to a direction parallel with the first surface 111, and the hook 142 is set on the end of the elastic arm 141. The hook 142 extends towards the direction perpendicular to the first surface 111, one side of the hook 142 indicated by arrowhead A is arc-shaped.

Preferably, the body 11 is made of flexile material, such as plastic, and metal is also acceptable.

Figure 2:
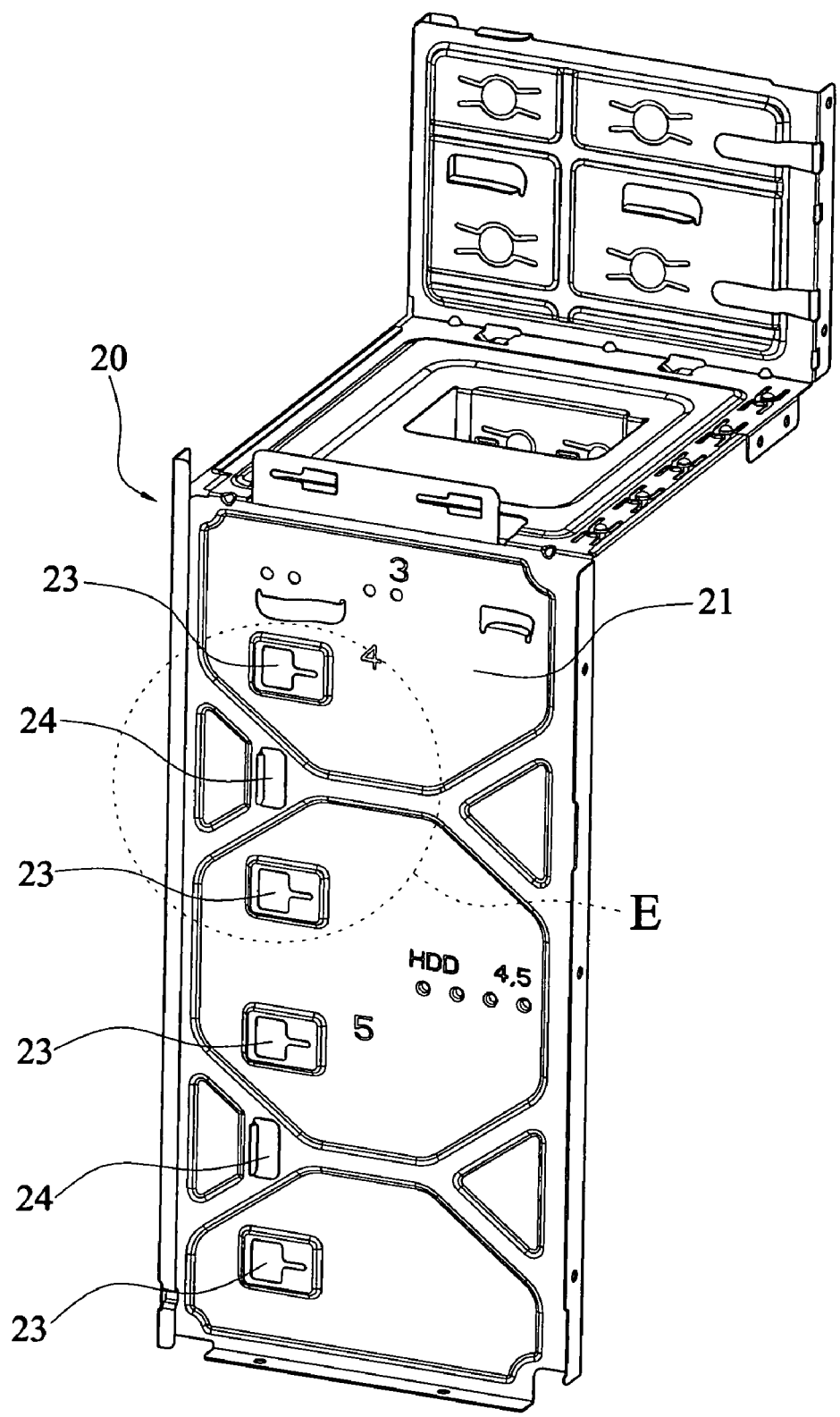
FIG. 2 is a perspective schematic view showing a computer case engaging with the fixture of the preferred embodiment according to the present invention.
Figure 3:
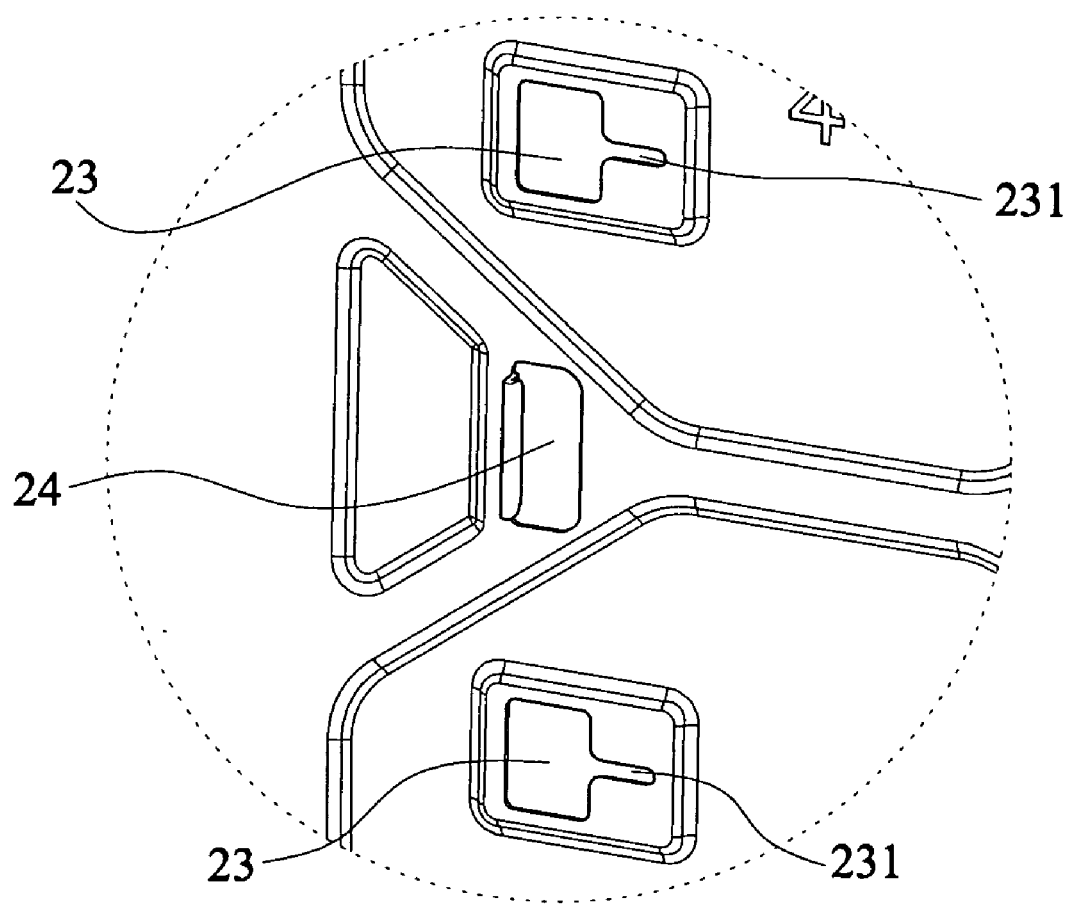
FIG. 3 is a partially enlarged view of part E in FIG. 2, showing the detailed structures of a positioning hole and a hook hole.

Please refer to FIG. 2 and FIG. 3. A positioning hole 23 is defined in a side wall 21 of a computer case 20 to cooperate with the positioning brace 13, and a hook hole 24 is defined in the side wall 21 to cooperate with the elastic buckle 14. A guiding slot 231 is set inside the positioning hole 23 to receive the guiding rib 133 of the positioning brace 13 in assembly. In the present invention, the computer case 20 may be fixed two fixtures 10 on.

Figure 4:
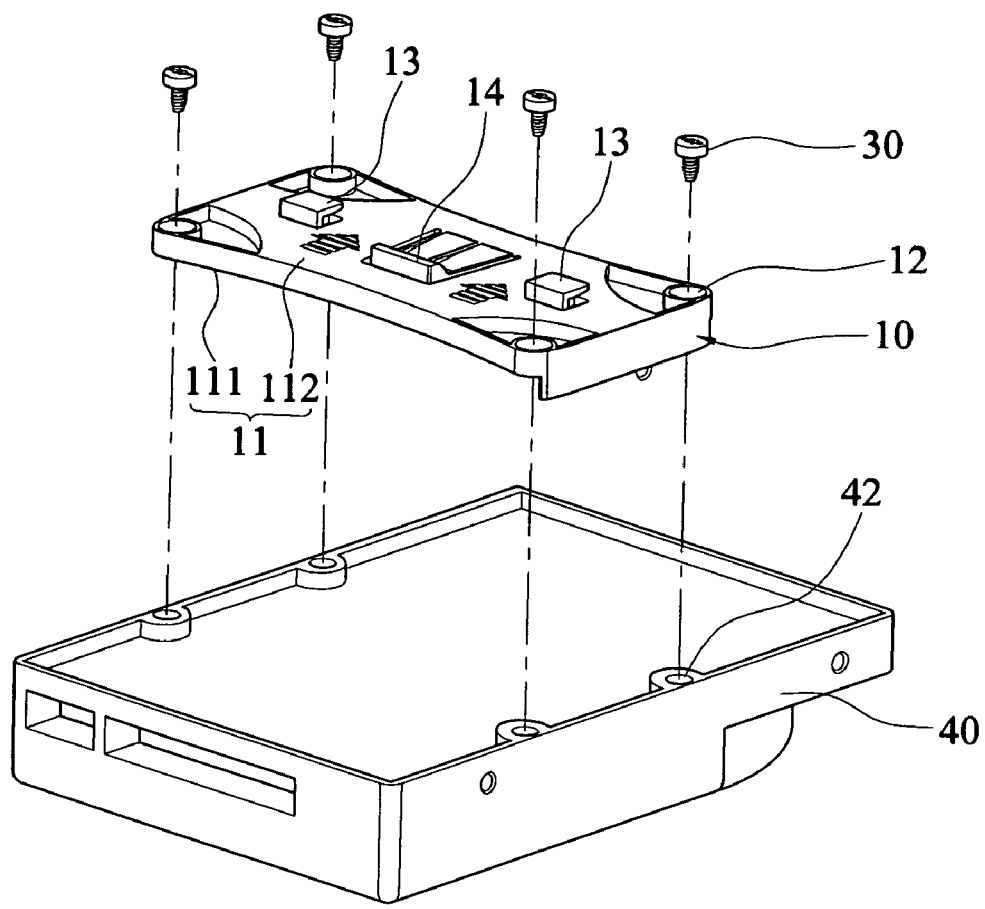
FIG. 4 is a perspective schematic view showing that the fixture of the preferred embodiment of present invention is being combined with a disk drive.

Please refer to FIG. 4. In assembly, the fixture 10 is fixed onto a disk drive 40 by screws 30. The disk drive 40 is standard, and general screw holes 42 are defined in the disk device 40. The position and the size of the screw holes 12 of the fixture 10 correspond to the screw holes 42 of the disk drive. The screws 30 are screwed so that the fixture 10 is fixed onto a disk drive 40, and the positioning brace 13 and the elastic buckle 14 are all towards a direction away from the disk drive 40.

Figure 5:
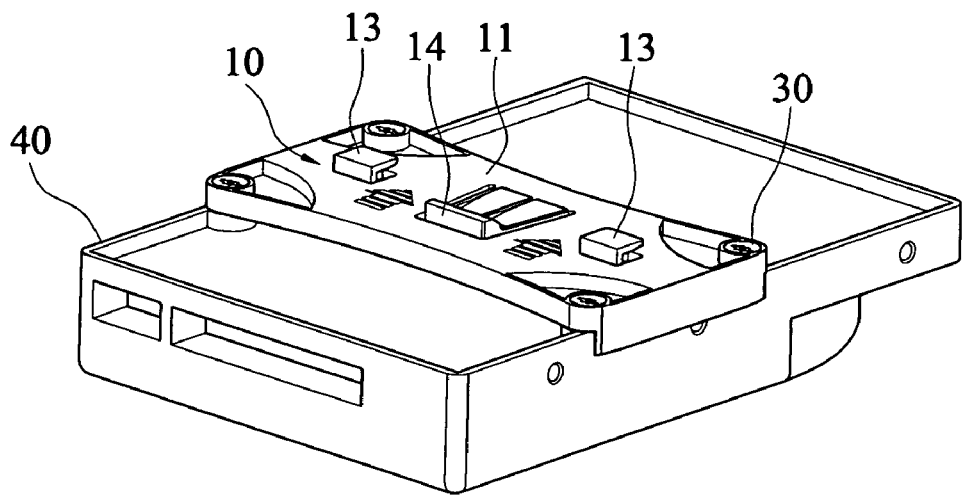
FIG. 5 is a perspective schematic view showing that the fixture of the preferred embodiment of present invention is combined with the disk drive.
Figure 6:
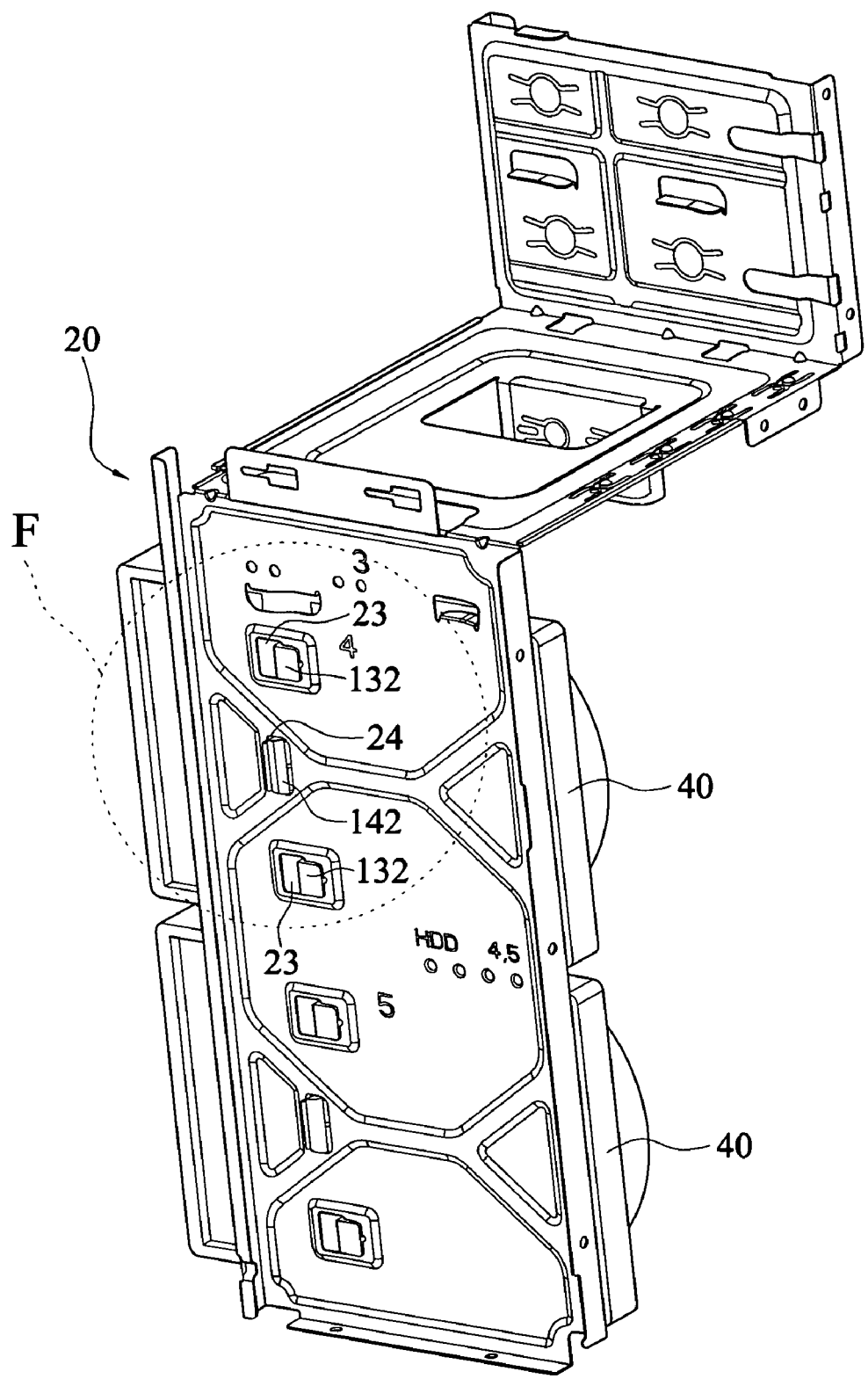
FIG. 6 is a perspective schematic view showing that the fixture combined with the disk drive is fixed inside the computer case.
Figure 7:
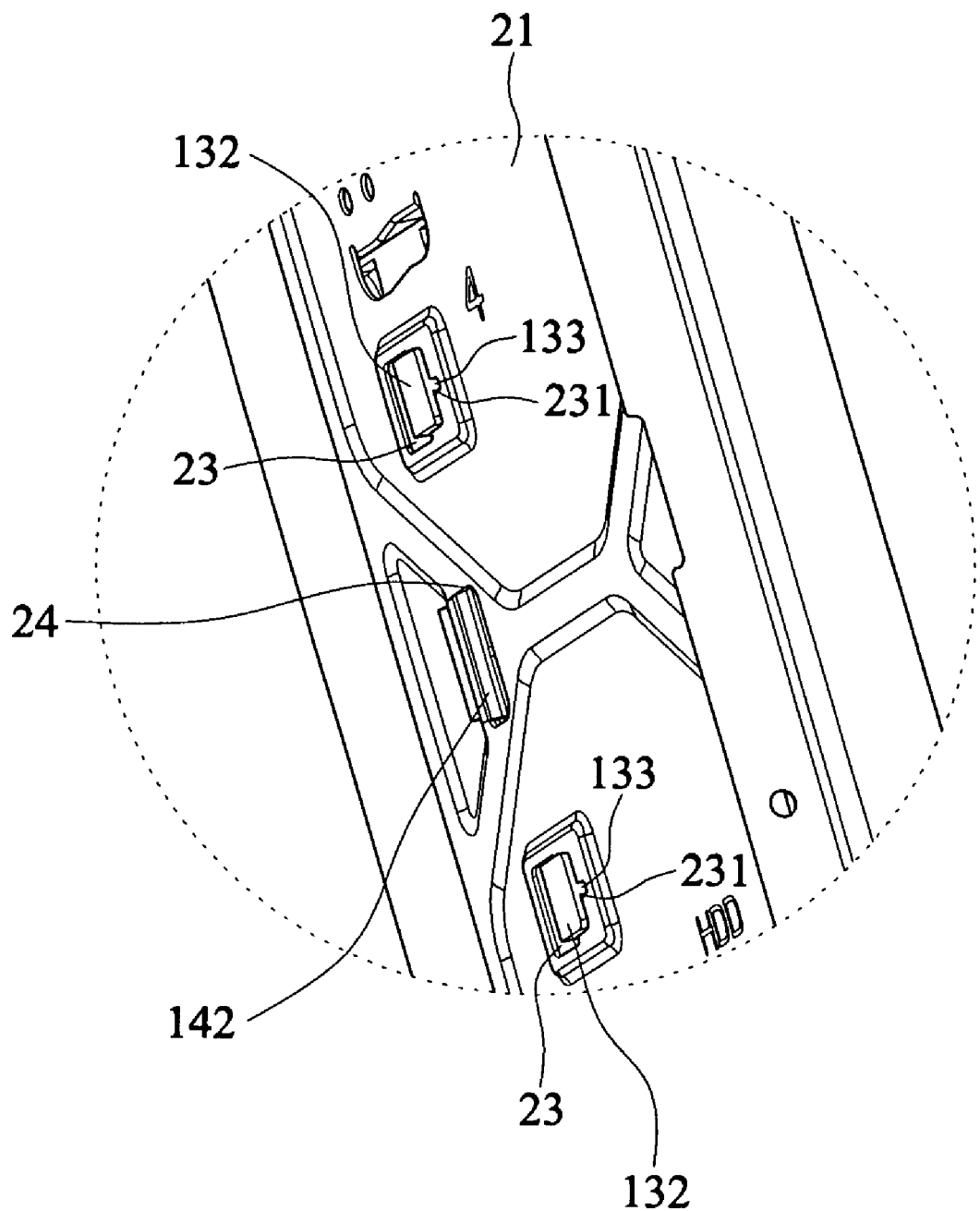
FIG. 7 is a partially enlarged view of part F in FIG. 6, showing the combining state of a positioning brace and an elastic buckle of the fixture and the inside wall of the computer case.

Please refer to FIG. 5 showing the fixture 10 combined with the disk drive 40, to FIG. 6, and to FIG. 7, showing a partially enlarged view of part F. The fixture 10 combined with the disk drive 40 is fixed onto the side wall 21 of the computer case 20. The fixing method includes: inserting the positioning brace 13 of the fixture 10 into the positioning hole 23 along the direction of the arrowhead A, extending the elastic buckle 14 into hook hole 24, extending the second bent piece 132 of the positioning brace 13 outwards from positioning hole 23, and then pushing the second bent piece 132 into positioning hole 23 along the direction of the arrowhead A until the guiding rib 133 is tightly inserted into guiding slot 231 and blocked on the outside surface of side wall 21. During this operation, the elastic buckle 14 may automatically attach on side wall 21 because of the arc shape of one side of hook 142, until the hook 142 is received in hook hole 24 to hook the outside surface of side wall 21 and reaches the blocking position. Thus, the fixture 10 combined with the disk drive 40 is fixed inside the computer case 20.

In disassembly, press the hook 142 of the elastic buckle 14 from top to down to easily withdraw the hook 142 from the hook hole 24. Then push the positioning brace 13 along a direction opposite to the direction of the arrowhead A to withdraw the guiding rib 133 from the guiding slot 231, and from the positioning hole 23. Thus, the disk drive 40 is disassembled from the side wall 21 of the computer case 20.

The positioning brace 13 and the elastic buckle 14 of the fixture 10 are designed as aforementioned so that the process that the disk drive 40 is assembled inside the computer case 20 is very simply, timesaving and low-cost, which is suit to be widely applied.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A fixture for fixing a disk drive inside a computer case, comprising:

at least a substantial vertically directed side wall, said side wall defining an outer enclosure of said computer case, said side wall further defining at least a positioning hole and at least said side wall hook hole therein, said positioning hole further having a guiding slot;

a body, at least a screw eye set on said body to fix said body on the disk drive;

at least a positioning brace, said positioning brace includes a first bent piece, a second bent piece and a linearly directed guiding rib; said first bent piece extends from said body for a length and then is bent to form said second bent piece, said guiding rib is formed on said second bent piece, extends toward said body and is perpendicular to said first bent piece and said second bent piece respectively, and said guiding rib and said first bent piece are set on a same side; and at least an elastic buckle extending from said body away from said disk drive for releasably insert of a hook section of said elastic buckle into a corresponding side wall hook hole to releasably fix said body inside said computer case, said elastic buckle being integrally formed with said body;

wherein said guiding rib is inserted into said guiding slot and said elastic buckle is removeably fixed to said side wall when inserted into said side wall hook hole whereby said fixture in combination with said disk drive are directly fixed on said side wall of said computer case.

2. The fixture according to claim 1, wherein the material of said body is plastic or metal.

3. The fixture according to claim 1, wherein said body has four corners, and said screw eyes are respectively defined on said four corners.

4. The fixture according to claim 1, wherein said body includes a first surface and a second surface opposite to said first surface, said first surface is combined with said computer case, and said second surface is combined with said disk drive.

5. The fixture according to claim 1, wherein said positioning brace is an L-shaped bent piece.

6. The fixture according to claim 1, wherein said elastic buckle is an elastic hook.

7. The fixture according to claim 6, wherein said elastic hook includes an elastic arm and a hook set on the end of said elastic arm, said elastic arm extends along a direction parallel to the surfaces of the body, and said hook extends along a direction perpendicular to the body surface.

8. The fixture according to claim 7, wherein said hook has an arc-shaped side wall.

9. The fixture according to claim 1, comprising two positioning braces and one elastic buckle, said elastic buckle located between said two positioning braces.

10. The fixture according to claim 1, wherein said positioning brace extends into said positioning hole and said elastic buckle extends into said hook hole.

* * * * *